No. 848,851. PATENTED APR. 2, 1907.
A. A. RAYMOND.
MACHINE FOR MAKING PAPER SHELLS.
APPLICATION FILED FEB. 26, 1904.

Witnesses:
Edw. R. Barrett
Luto L. Alter

Inventor:
Alfred A. Raymond
By Rector & Hibben
His Attorneys.

No. 848,851. PATENTED APR. 2, 1907.
A. A. RAYMOND.
MACHINE FOR MAKING PAPER SHELLS.
APPLICATION FILED FEB. 26, 1904.

No. 848,851. PATENTED APR. 2, 1907.
A. A. RAYMOND.
MACHINE FOR MAKING PAPER SHELLS.
APPLICATION FILED FEB. 26, 1904.

Witnesses:
Edw. P. Barrett
Luts S. Alten

Inventor:
Alfred A. Raymond
By Rector & Hibben
His Attorneys

No. 848,851. PATENTED APR. 2, 1907.
A. A. RAYMOND.
MACHINE FOR MAKING PAPER SHELLS.
APPLICATION FILED FEB. 26, 1904.

Witnesses:
Edw. P. Barrett
Luts L. Alter

Inventor:
Alfred A. Raymond
By Rector & Hibben
His Attorneys

No. 848,851. PATENTED APR. 2, 1907.
A. A. RAYMOND.
MACHINE FOR MAKING PAPER SHELLS.
APPLICATION FILED FEB. 26, 1904.
10 SHEETS—SHEET 10.

Witnesses:
Edw. R. Barrett
Luke G. Alter

Inventor:
Alfred A. Raymond
By Rector & Hibben
his Attorneys

UNITED STATES PATENT OFFICE.

ALFRED A. RAYMOND, OF CHICAGO, ILLINOIS, ASSIGNOR TO RAYMOND CONCRETE PILE COMPANY, OF TRENTON, NEW JERSEY, A CORPORATION OF NEW JERSEY.

MACHINE FOR MAKING PAPER SHELLS.

No. 848,851.      Specification of Letters Patent.      Patented April 2, 1907.

Application filed February 26, 1904. Serial No. 195,411.

*To all whom it may concern:*

Be it known that I, ALFRED A. RAYMOND, a citizen of the United States, residing at Chicago, in the county of Cook and State of Illinois, have invented certain new and useful Improvements in Machines for Making Paper Shells, of which the following is a specification.

My invention relates to a machine for the making or rolling of shells, preferably from paper, to be employed more particularly as the outer coverings or temporary shells used in the practice of my process of forming concrete piles as the same is described and claimed in my prior patents of the United States, Nos. 589,026 and 700,707, issued, respectively, on August 31, 1897, and May 20, 1902. These shells are tapered, and the concrete piles resulting are correspondingly tapered. In the first-mentioned patent the shells are continuous—that is, the same are made in a single piece—while in the second patent such shells are made in sections. My machine is adapted to make shells of this character of any length and taper, both the long single shells and the sectional shells. The length of the shells made on the machine depends, of course, on the length of the winding-roll used, and the taper depends on the taper of such roll.

In the drawings, Fig. 15, a central section on line 15 of Fig. 1, and Fig. 16 a detail view of one of the adjustable bearing-boxes of the two lowermost rolls and the adjusting mechanism.

Figure 3:
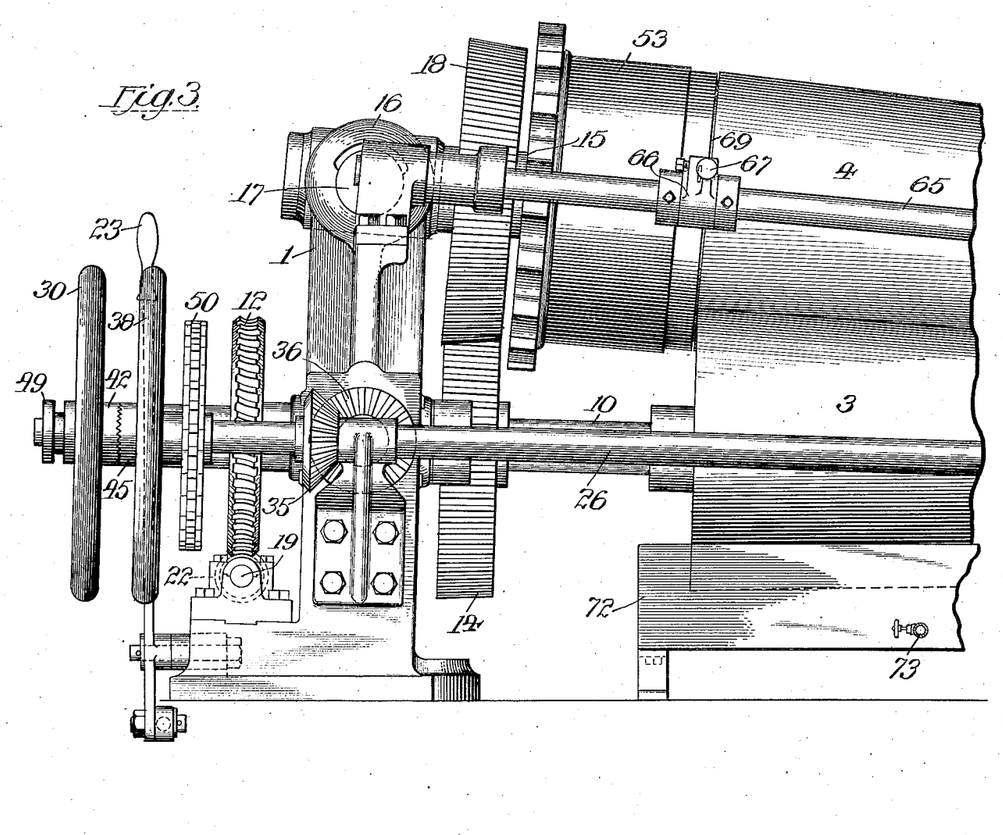
Fig. 3, a side elevation of the forward end of the machine.

My machine comprises in the present instance a main frame 1, on which is supported the driving mechanisms and the journals for one end of the rolls. These rolls are here three in number—namely, a compress-roll 2, a pitch-roll 3, and a shell or winding-roll 4—the first two of which are arranged in substantially the same horizontal plane and below the shell-roll, but in such proximity, as indicated in Fig. 3. These rolls are tapered to the required degree, according to the degree of taper desired in the resulting product or shell. The rolls are hollow truncated cones of metal or such material suitable for the purpose and provided with end heads secured to shafts journaled at one end in the main frame and at the other end in a frame 5. The roll 2 has a shaft 6, journaled in a slidable bearing-box 7 in said frames 1 and 5 and extending through its journal-box, where its end is provided with a driven worm-gear 8. This shaft is journaled in a bearing-box 9, arranged to slide laterally in frame 5. Likewise the roll 3 has a shaft 10, journaled in a slidable bearing-box 11 in frame 1, and a driven worm-gear 12. Likewise also the shaft of this roll 3 is journaled in a bearing-box 13, arranged to slide laterally in the frame 5 in the manner and for the purposes hereinafter explained. The shaft 6 of the compress-roll is also provided at a point between such roll and the journal-box 7 with a driving-gear for driving the winding-roll, as hereinafter explained.

The shell or winding-roll 4 is secured to a shaft 15, whose front end is journaled on frame 1 in bearing-box 16, which is mounted thereon by means of the trunnions 17 in such manner that the entire roll 4 may be swung upwardly on these trunnions as pivots in order to permit and facilitate the removing of the completed shell. The shaft 15 of the winding-roll is provided with a gear 18, meshing with the gear 14 on the shaft of the compress-roll and driven thereby.

Figure 1:
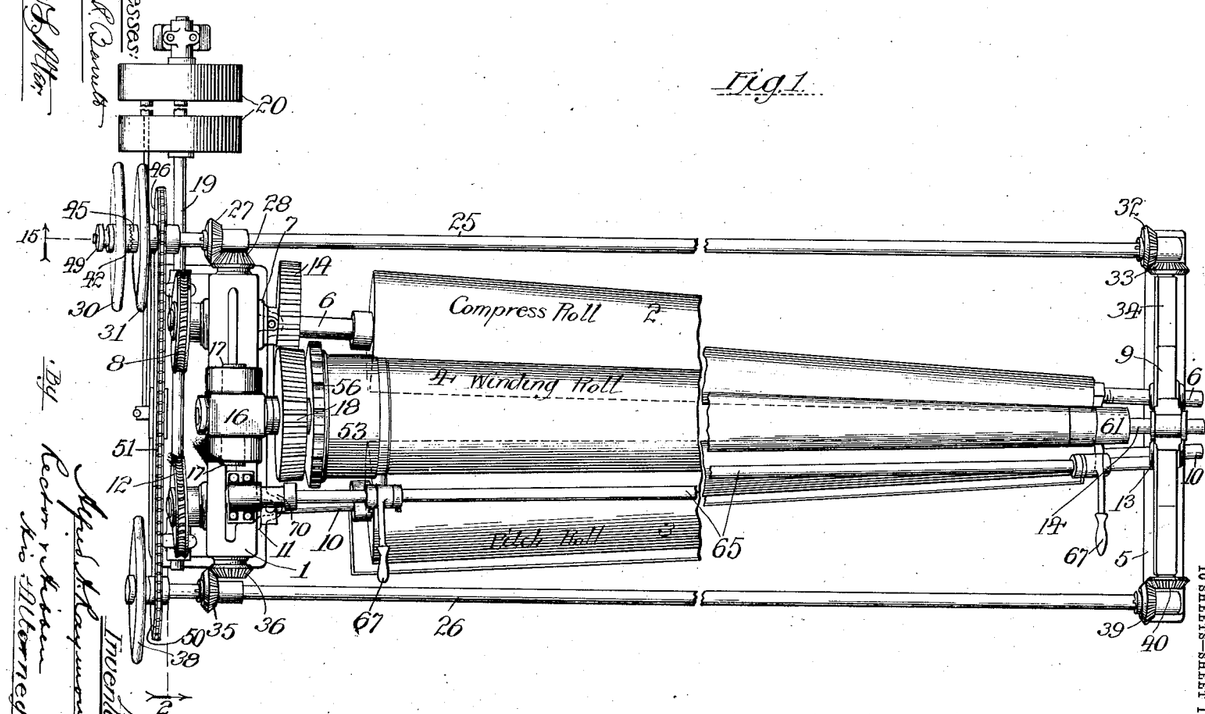
Figure 1 is a plan view of my machine shown broken away intermediate its length.
Figure 2:
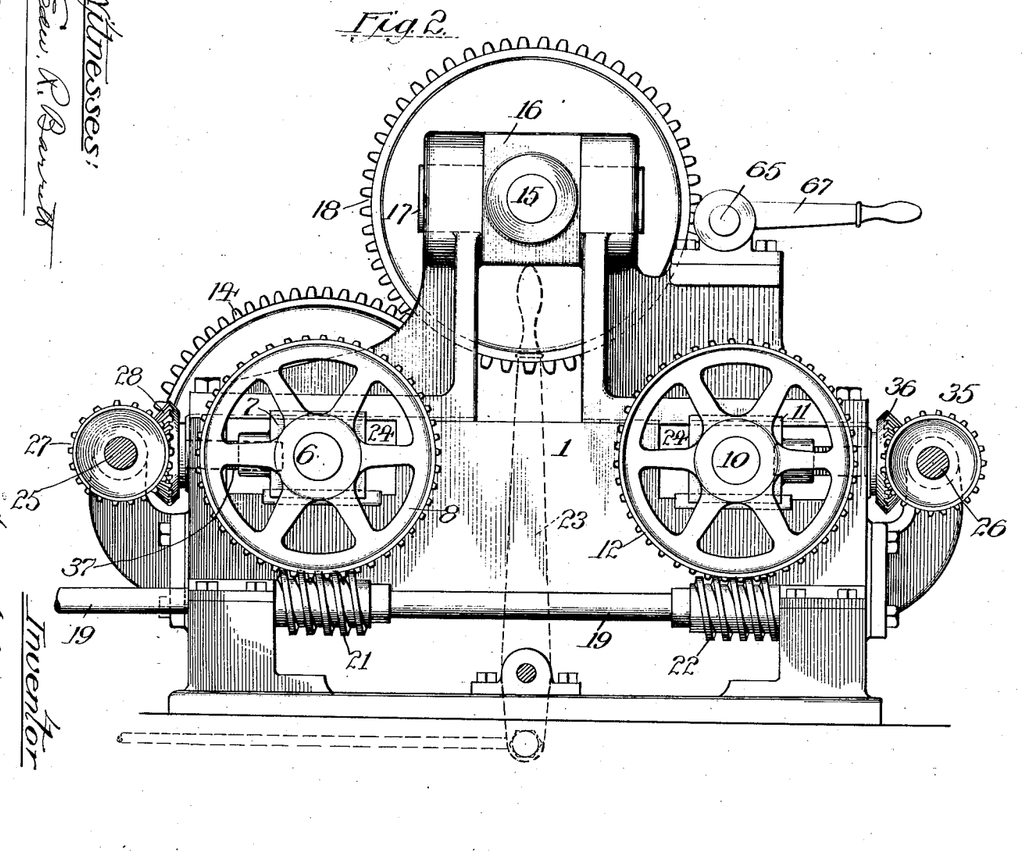
Fig. 2, a sectional elevation on line 2 of Fig. 1, illustrating the forward end of my machine.

The driving connections are clearly illustrated in Figs. 1, 2, and 3. The main driving-shaft 19, having the usual pulleys 20, is journaled in the main frame 1 of the machine and provided with driving-worms 21 and 22, arranged to mesh with and drive the worm-gears 8 and 12, respectively, which are secured to the shafts 6 and 10, respectively, with the result that the rolls 2 and 3 are rotated. These worms are movable longitudinally of the driving-shaft in suitable manner. An operating-handle 23, connected with the pulley mechanism 20, is employed for stopping and starting the machine.

As hereinbefore stated, the bearing-boxes of the shafts of the compress-roll and pitch-roll are arranged to slide, and, as shown more particularly in Fig. 3, such boxes are adapted to slide laterally of the machine in horizontal slots 24. For the purpose of sliding these boxes either separately and independently of each other or simultaneously, and in like manner for sliding the bearing-boxes of such shafts at the rear end of the machine in unison with their companion boxes at the front end thereof, I have devised the following mechanism: Upon the frames 1 and 5 are journaled the two long operating-rods 25 and 26, coöperating, respectively, with the bearing-boxes of the shafts 6 and 10 and extending longitudinally of the rolls. Referring to the gearing at the front end of the machine the rod 25 has a miter-gear 27, adapted to mesh with a corresponding miter-gear 28, secured to one end of a rod 29, whose other end is screw-threaded to enter and engage a tapped hole in the bearing-box 7, with the result that such box, together with its shaft 6 and roll, may be shifted or adjusted laterally, according to the direction of rotation of the miter-gear 27. The rod 25 is extended forwardly and thereat provided with a hand-wheel 30, whereby the operator may rotate the miter-gear 27 and secure the proper adjustment of the compress-roll and move it toward or away from the winding-roll as desired. The rod 25 also has at its forward end a hand-wheel 31 for simultaneously actuating both rods 25 and 26 in a manner hereinafter explained. The rod 25 at its rear end has a miter-gear 32 similar to gear 27, such gear 32 meshing with another miter-gear 33, secured to one end of a horizontal rod 34, whose other end is screw-threaded to engage a screw-threaded hole tapped into the bearing 9, whereby the latter, as well as the roll 2, may be slid laterally of the axis of rotation of the roll. In like manner the rod 26 has at its forward end a miter-gear 35, meshing with the miter-gear 36 on a rod 37, which has screw-threaded engagement with a bearing-box 11 of the shaft 10 of roll 3. A hand-wheel 38 is secured to rod 26 for actuating the same. In like manner also the rear end of rod 26 has a miter-gear 39, meshing with a similar gear 40 on one end of a rod 41, whose other end is screw-threaded to engage the bearing-box or journal 13 of the shaft 10, whereby the latter may be adjusted and shifted laterally as desired.

Figure 15:
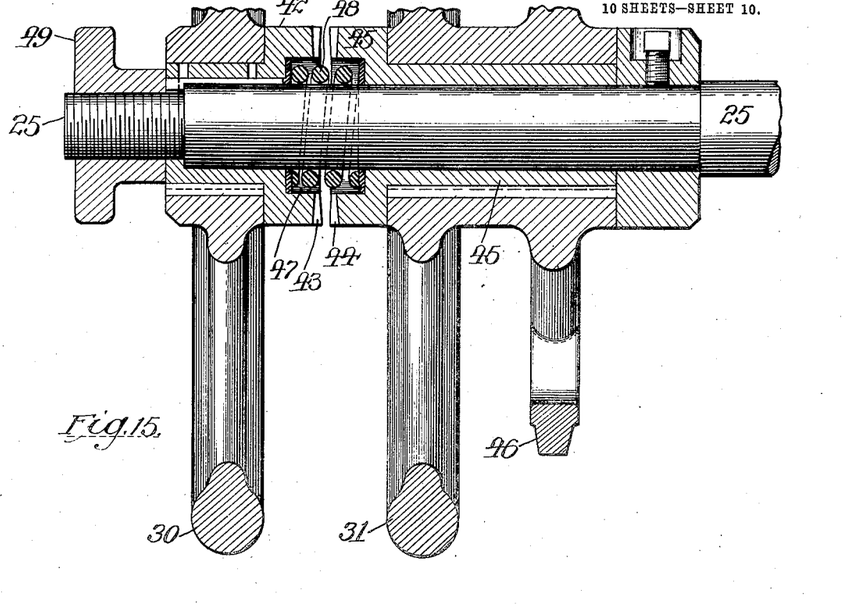
Figure 16:
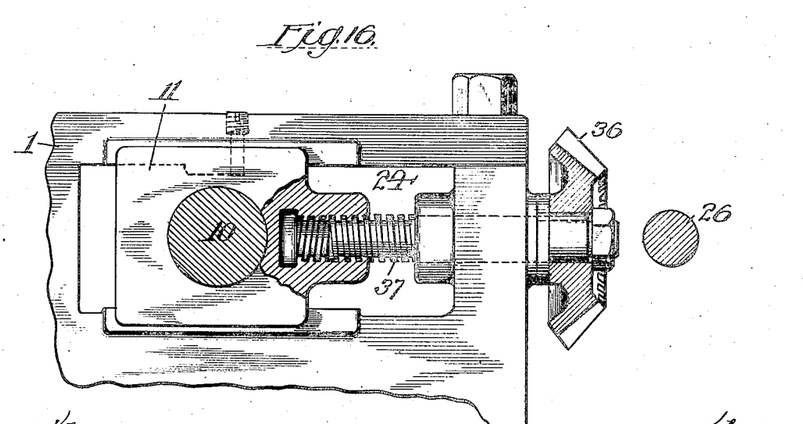

As hereinbefore stated, the two rods 25 and 26 are arranged to be operated simultaneously or independently at the will of the operator, and for such simultaneous operation I provide the following mechanism: Referring more particularly to Figs. 1, 3, and 15, the hand-wheel 30 is keyed or otherwise secured to a sleeve 42, forming a sliding hub, which is in turn secured or keyed to the operating-rod 25, with the result that every movement of the hand-wheel 30 is transmitted to the rod 25, and the latter thereby actuated. This sleeve 42 is provided on its inner edge with teeth 43, adapted to engage corresponding teeth 44 in a corresponding hub or sleeve 45, which is loosely mounted on rod 25, but keyed to the hand-wheel 31, which also carries a sprocket-wheel 46. The adjacent flanged faces of the sleeves 42 and 45 form a spring case or chamber 47, in which is arranged a coiled spring 48, tending to press the hub or sleeve 42 forwardly (to the left in Fig. 15) when permitted by the nut 49, which screws upon the forward end of the rod 25.

In the position of the parts more clearly illustrated in Fig. 15 the sleeves or hubs 42 and 45 are out of engagement, so that the inner hand-wheel 31 and its sprocket-wheel are free to turn upon the rod 25 without effect thereon, in which event rotation of the hand-wheel 30 actuates rod 25 only. When, however, nut 49 is screwed up, forcing the hubs or sleeves 42 and 45 into engagement against the tension of spring 48, the hand-wheel 31 and its sprocket-wheel 46 will be operatively connected with the rod 25, and the rotation of the hand-wheel 30 will thereby be communicated to the other rod 26 in the following manner:

As shown in Figs. 1 and 3, upon the rod 26 is mounted a sprocket-wheel 50, corresponding in relative position and size with the sprocket-wheel 46 and operatively connected with the latter by a sprocket-chain 51, so that movement of hand-wheel 31 is transmitted to hand-wheel 38 and its rod 26, and vice versa. By the provision of the extra hand-wheel 31 the rod 26 may be actuated from both sides of the machine. Now, assuming that the hubs 42 and 45 are in operative engagement rotation of the hand-wheel 30 is transmitted to both rods 25 and 26, and the same thereby operated in unison, with the results already stated.

Figure 6:
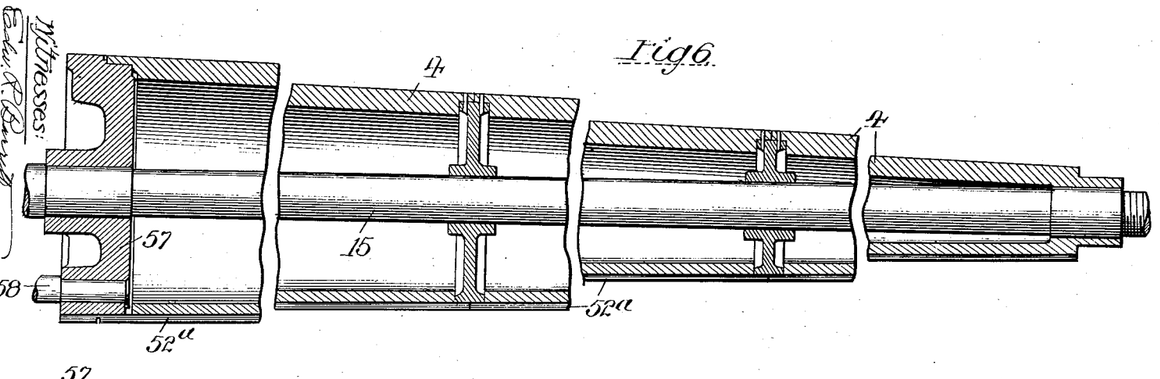
Figs. 6, 7, and 8, detail views of the winding-roll and clamping-bar.
Figure 7:
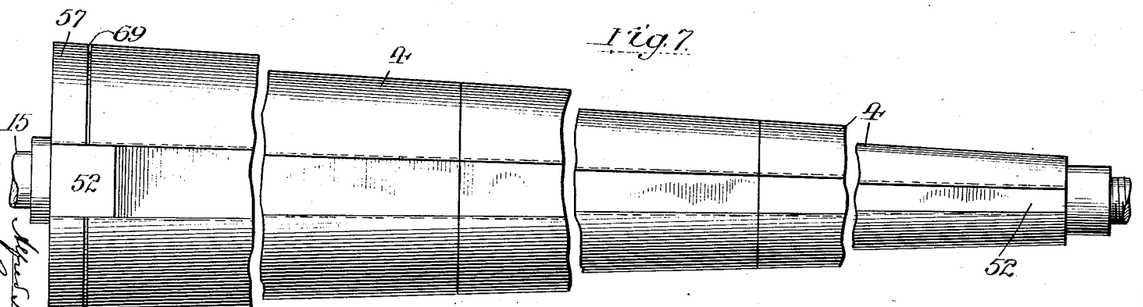
Figure 8:
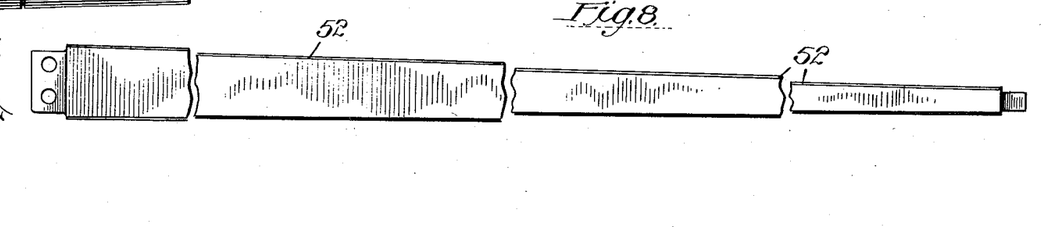
Figure 12:
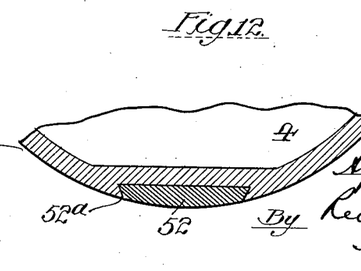
Fig. 12, a fragmentary transverse section of the winding-roll, illustrating the clamping-bar therein.

For the purpose of gripping the presented edge of the first sheet of paper the winding-roll is provided with paper clamping or gripping mechanism, the preferred form of which is illustrated in detail in Figs. 6, 7, and 8 and also Fig. 12. The surface of the winding-roll has a longitudinal channel 52$^a$, which is undercut, as shown in Fig. 12, to admit a clamping plate or bar 52, whose edges are beveled to enter such undercut, whereby such bar is capable of endwise or longitudinal movement, but cannot drop out radially of the winding-roll. It is evident that a movement of this bar longitudinally endwise toward the head of the winding-roll will open up a slot extending longitudinally of such roll and that an opposite movement will cause a gripping of any paper sheet whose edge has been inserted therein.

Figure 9:
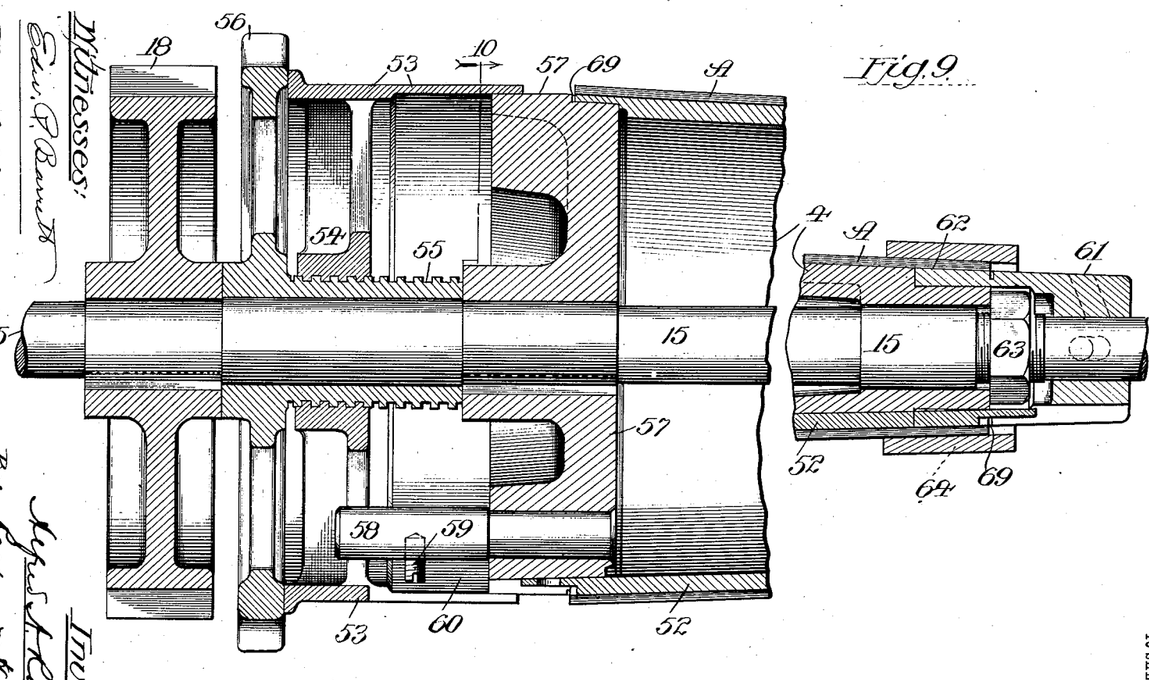
Fig. 9, a central longitudinal section of the ends of the winding-roll and associated parts.
Figure 10:
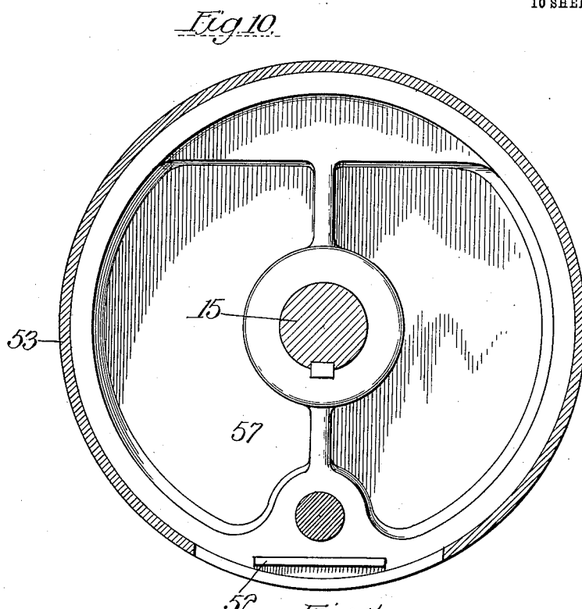
Fig. 10, a sectional elevation on the line 10 of Fig. 9.
Figure 11:
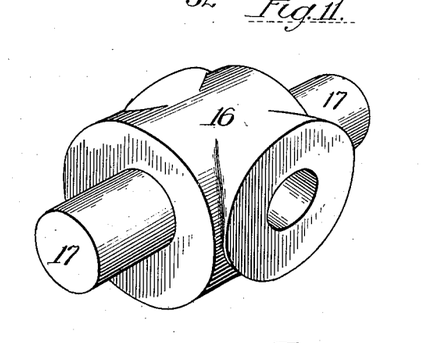
Fig. 11, a perspective of the pivoted journal of the winding-roll.

In order to facilitate or assist in the removal of the completed shell, I provide stripping mechanism which, as detailed in Fig. 9, comprises a stripper-ring 53, arranged axially of the winding-roll with its marginal edges occupying the same planes as the head or longer end of a completed shell, with the result that movement of the stripper-ring to the right, Fig. 9, will force or strip the shell from the winding-roll by contact against the head of such shell. To move the stripper-ring bodily against the shell, I provide this ring with a hub 54, which is externally threaded to receive the external screw-threads of the extended hub 55 of an operating-wheel 56. This hub is loosely mounted on the shaft 15 of the winding-roll and bears against the end head 57 thereof, with the result that rotation of the wheel 56 in the proper direction moves the stripper-ring to the right, Fig. 9, and against the shell, for the purposes already explained. The ring is held against rotation in suitable manner, as by means of the stud 58, extending from the head 57 and having a depending screw-pin 59, received by a slot 60 in the ring. It is obvious that this slot-and-pin arrangement will prevent axial movement of the ring and cause the latter to move longitudinally of the winding-roll. Still referring to Fig. 9, it will be observed from the right-hand end portion of such figure that the smaller end of the winding-roll has a lifting-head 61, which, together with the flanges 62 at its forward end, conforms to the taper of the winding-roll. These flanges 62 are set into the winding-roll, while the body portion of the lifting-head projects beyond the end of such roll. A nut 63, screwing on the reduced end of the shaft 15 and against the extreme right-hand end, Fig. 9, of the winding-roll, serves to secure such end thereof to its shaft.

In practice I employ a lifting-ring 64, applied, as shown in Fig. 9, after the shell is wound, and arranged to receive the smaller end of the shell and clamp the same against the flanges of the lifting-head, with the result that when the latter is removed (after the winding-roll has been swung to an elevated position) the completed shell is withdrawn and stripped from such winding-roll.

For cutting or trimming the ends of the shell the machine is provided with suitable mechanism comprising, in the present instance, a pair of knives adapted to be moved or rocked into operative relation with respect to the winding-roll. As herein shown, particularly in Figs. 1, 2, 4, 13, and 14, a knife-supporting rod or bar 65, extending longitudinally of the winding-roll, is mounted at its ends in the frames 1 and 5 and arranged to carry the two knives, each consisting of the block portion 66, having a handle 67 and provided with a knife-blade 68.

Figure 13:
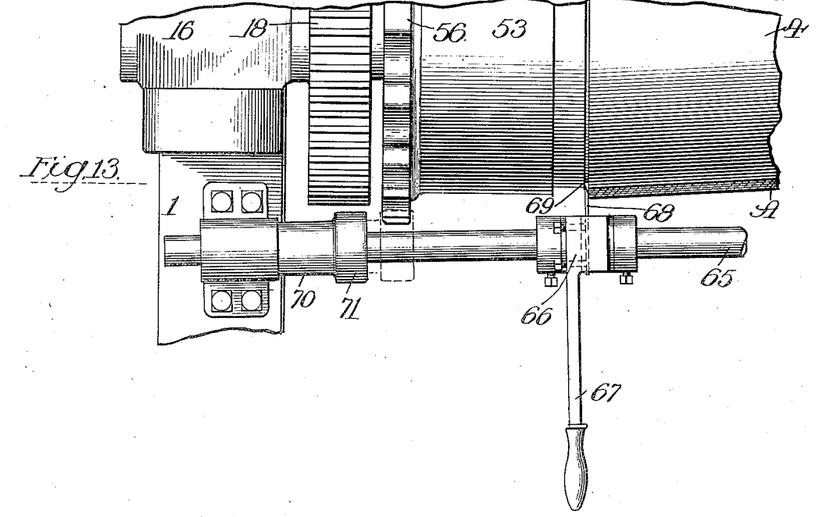
Figs. 13 and 14, detail views of the knife mechanism.
Figure 14:
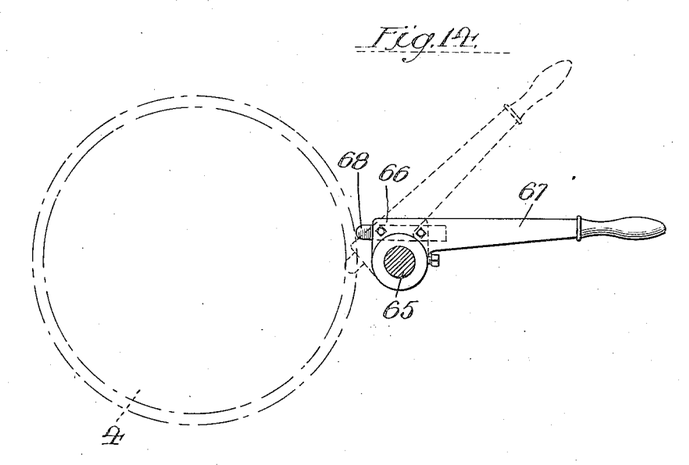

When the knife is in the position shown in full lines in Fig. 14, it is in inoperative position; but when swung to the position shown therein in dotted lines the knife-blade is thrown inwardly and against the end of the shell, thereby cutting and trimming such end of the shell. The two knives are similar in construction and operation and enable both ends of the shell to be trimmed. I prefer to provide the winding-roll with circumferential grooves 69 in register with the knife-blades, Figs. 3, 9, and 13, the same constituting cutting-grooves to facilitate the cutting and prevent dulling of the knives.

As shown more particularly in Fig. 13, the operating-wheel 56, which is connected to the screw-threaded hub 55 for actuating the stripper-ring 53, is locked against accidental rotation by means of a locking-sleeve 70, movable in suitable manner longitudinally on the knife-supporting bar, but prevented from axial movement thereon. This locking-sleeve has an expanded head 71, adapted to enter the toothed or scalloped wheel 56 and thereby lock the same.

Figure 4:
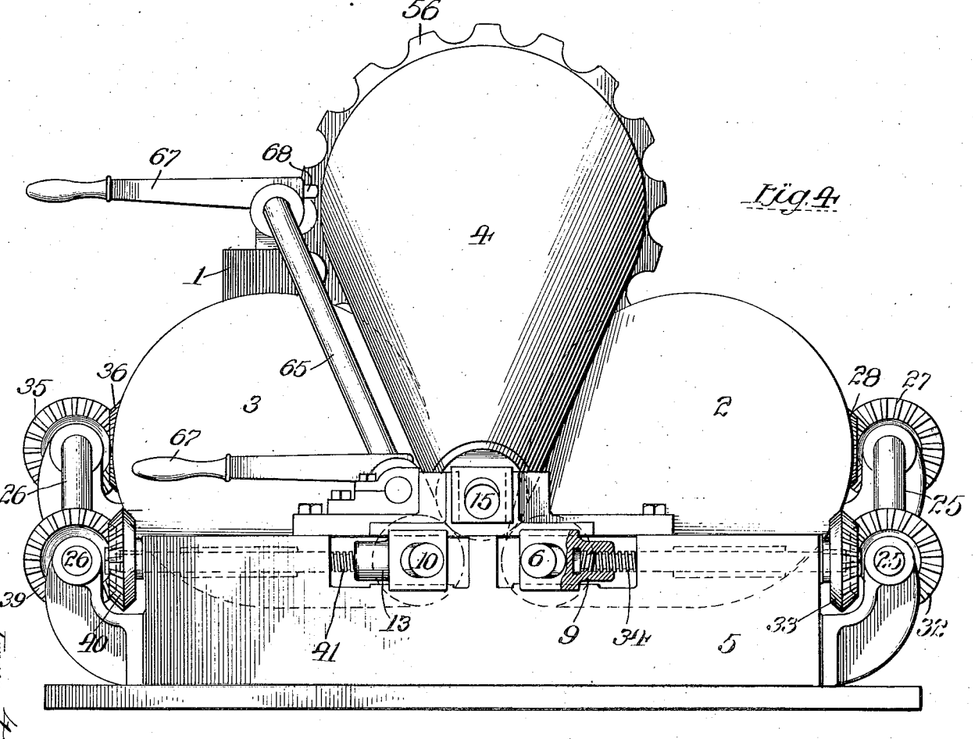
Fig. 4, an end elevation thereof looking from the rear end.
Figure 5:
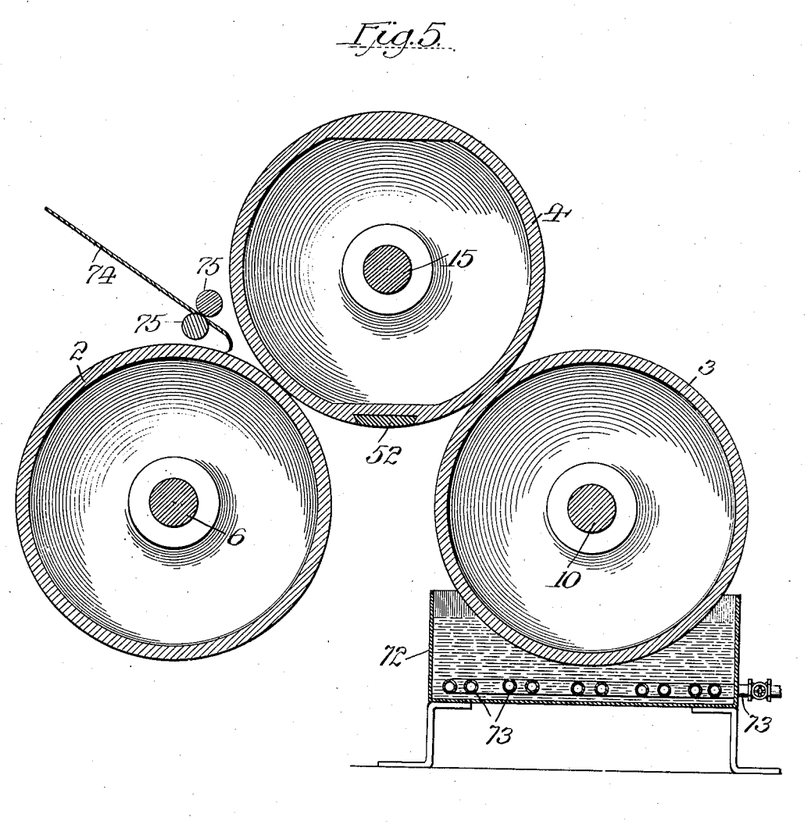
Fig. 5, a transverse section of the three rolls and pitch-tank.

For convenience I have designated the roll 3 as a "pitch-roll," because of the fact that the adhesive and waterproof substance which it applies to the sheets of paper being wound on the winding-roll 4 is pitch by preference, although other and equivalent substances having the same desirable properties could be employed. As indicated in Figs. 1, 3, and 4, this roll 3 runs as to its lower periphery in a bath of pitch contained in a tank 72, extending the length of such pitch-roll and heated in suitable manner, as by the steam-pipes 73.

In practice the sheets of paper, usually heavy Manila paper, are cut to trapezoidal form, so as to fold up properly to make a truncated conical tube, a supply of which sheets is placed on a feeding-table 74, arranged on one side of the compress-rolls. If desired, feed-rolls 75 may also be provided for feeding the sheets to the machine.

To form a shell with the machine described the presented edge of the first sheet of paper is clamped by the sliding clamping-bar 52, and upon rotation of the winding-roll in the proper direction the paper is wound to truncated conical form, with its longitudinal edges overlapping. During the winding of the sheet the compress-roll 2 presses the same tightly against the winding-roll with any desired degree of pressure, as determined by the operator, while the pitch-roll gives the outer surface of the sheet a coating of pitch. The presented edge of a second sheet of paper is laid on the first sheet just behind the lap or joint thereof, and the same operation is repeated until a shell A of the proper thickness is obtained. When it is desired to remove the shell A, the rear end of the shaft of the winding-roll is released from its bearing and swung upwardly, at which time the suitable lifting mechanism is attached to the lifting-head 61 and the stripper-ring also operated, as well as the clamping-par 52, to release the edge of the first sheet of paper. In lifting the shell in the manner stated the head 61 and the clamping-sleeve 64, which is applied before the lifting operation, are bodily removed, the flanges of the lifting-head acting as a ferrule to keep the end of the shell distended and to prevent it from being collapsed and injured in the act of removing the shell. Prior to the elevation or swinging of the winding-roll the knives are brought into action in the manner already described and the ends of the shell thereby squared off and trimmed. Likewise prior to the swinging of the winding-roll the compress-roll and the pitch-roll, if desired, (either independently or simultaneously,) are adjusted laterally away from the winding-roll.

I claim—

1. A shell-forming machine comprising a winding-roll, a compress-roll, a roll for applying adhesive material, said rolls being geared to rotate together, and means for permitting the winding-roll to swing in a plane of its longitudinal axis.

2. A shell-forming machine comprising a winding-roll a compress-roll, and a roll for applying adhesive material, said rolls being geared to rotate together, said winding-roll being pivoted at one end to swing in a plane of its longitudinal axis.

3. A shell-forming machine comprising a winding-roll arranged to swing in a plane of the longitudinal axis, a compress-roll, a roll for applying adhesive material, and power-multiplying means for shifting the compress-roll and adhesive-applying roll toward or away from the winding-roll.

4. A shell-forming machine comprising a winding-roll arranged to swing in a plane of its longitudinal axis, a compress-roll, a roll for applying adhesive material, journal-boxes for the respective rolls, and means for shifting the journal-boxes and the compress-roll and adhesive-applying roll toward or away from the winding-roll.

5. A shell-forming machine comprising a winding-roll, a compress-roll, a roll for applying adhesive material, journal-boxes for the respective rolls, and means for shifting the journal-boxes and the compress-roll and adhesive-applying roll toward or away from the winding-roll in combination with means for permitting the swinging of the winding-roll in a plane of its longitudinal axis.

6. A machine for forming tapering shells comprising a winding-roll, a compress-roll, a roll for applying adhesive material, said rolls being tapered, and being provided with journals at both ends, and means for permitting the swinging of the winding-roll in a vertical position.

7. A machine for forming tapering shells comprising a winding-roll, a compress-roll, a roll for applying adhesive material, said rolls being tapered, the compress and the adhesive-applying rolls being arranged in the same horizontal plane, and the winding-roll being arranged in a plane above the other two rolls.

8. A machine for forming paper shells, comprising a winding-roll, a compress-roll, a roll for applying adhesive material, said rolls being tapered and the compress-roll and the roll for applying adhesive material being arranged in substantially the same horizontal plane, and means for forcing the completed shell from the winding-roll.

9. A machine for forming paper shells comprising a winding-roll, a compress-roll, a roll for applying adhesive material, said rolls being tapered and the compress-roll and the roll for applying adhesive material being arranged in subtantially the same horizontal plane, and a movable ring upon the winding-roll for forcing or stripping the completed shell therefrom.

10. A machine for forming tapering shells comprising a winding-roll, a compress-roll, a roll for applying adhesive material, said rolls being tapered, a stripper-ring arranged around the larger end of the winding-roll, and power-multiplying means carried by said winding-roll and adapted to move said stripper-ring longitudinally of the roll to force the completed shell therefrom.

11. A machine for forming tapering shells comprising a winding-roll, a compress-roll, a roll for applying adhesive material, said rolls being tapered, and a wedge-shaped clamp-bar extending longitudinally of the winding-roll.

12. A machine for forming tapering shells comprising a winding-roll, a compress-roll, a roll for applying adhesive material, said rolls being tapered, and a laterally-wedging clamp-bar set into the winding-roll and extending longitudinally thereof.

13. A machine for forming tapering shells comprising a tapering winding-roll having at its smaller end a sleeve removable with the completed shell.

14. A machine for forming tapering shells comprising a tapering winding-roll, and a removable sleeve set into the smaller end of such roll and conforming to the taper thereof.

15. A machine for forming tapering shells comprising a tapering winding-roll pivoted at one end to swing vertically and a removable sleeve arranged on the smaller end thereof.

16. A shell-forming machine comprising a winding-roll, a compress-roll, a roll for applying adhesive material, laterally-adjustable journal-boxes for the last two named rolls, and means for adjusting or shifting such journals either independently or simultaneously at the will of the operator.

17. A shell-forming machine comprising a winding-roll, a compress-roll, a roll for applying adhesive material, laterally-adjustable journal-boxes for the last two named rolls, screw-feed mechanism for said boxes respectively for shipping them, and means for connecting said mechanism at the will of the operator for joint or simultaneous action.

18. A shell-making machine comprising a rotatable and pivoted winding-roll, and a lifting-head arranged on one end of the roll but removable therefrom.

19. A shell-making machine comprising a rotatable and pivoted winding-roll of tapered form, and a lifting-head arranged on the smaller end of such roll and conforming to the taper thereof.

20. A shell-making machine comprising a rotatable and pivoted winding-roll of tapered form, and a lifting-head having flanges conforming to the taper of the roll and inset in its smaller end.

21. A shell-making machine comprising a rotatable and pivoted winding-roll of tapered form, and a removable lifting-head having flanges conforming to the taper of the roll and inset in its smaller end, such head normally bearing against said end of the roll.

22. A shell-making machine comprising a rotatable and pivoted winding-roll of tapered form, a lifting-head having flanges conforming to the taper of the roll and inset in its smaller end, and a lifting-ring arranged to clamp the completed shell against the flanges of the lifting-head.

23. A shell-making machine comprising a rotatable and pivoted winding-roll of tapered form, a removable lifting-head arranged on the smaller end of the roll, and a lifting-ring for clamping the smaller end of the shell between itself and the lifting-head.

24. A machine for forming tapering shells comprising a winding-roll having means for gripping the shell material, a compress-roll, and a roll for applying adhesive material, all of said rolls being positively driven and said compress and adhesive-applying rolls being arranged to bear strongly against said winding-roll.

25. A machine for forming tapering shells comprising a tapering winding-roll, a compress-roll, and a roll for applying adhesive material, said compress and adhesive-applying rolls being positively driven, and being arranged to bear strongly against said winding-roll.

26. A machine for forming tapering shells comprising a winding-roll, a compress-roll and a roll for applying adhesive material, all of said rolls being tapered and unyieldingly supported and said adhesive-applying roll being adapted to apply pressure to material wound upon said winding-roll.

27. A machine for forming tapering shells, comprising a tapering winding-roll, means thereon for gripping the shell material, and means arranged concentrically of said winding-roll for stripping the shell therefrom.

28. A machine for forming tapering shells comprising a tapering winding-roll, means thereon for gripping the shell material, means carried on said winding-roll for stripping the shell therefrom, and a tapering compress-roll coöperating with the winding-roll.

29. A machine for forming tapering shells comprising a tapering winding-roll, means thereon for gripping the shell material, power-multiplying means carried on said winding-roll for stripping the shell therefrom, a tapering compress-roll coöperating with the winding-roll, and a roll for applying adhesive material.

30. A shell-forming machine comprising a winding-roll, a compress-roll, a roll for applying adhesive material, such winding-roll being pivoted at one end, journals for both ends of said compress and adhesive-applying rolls, and means for shifting said journals with their associated rolls toward or away from the winding-roll.

31. A shell-forming machine comprising a winding-roll, a compress-roll, a receptacle for containing a supply of adhesive material, a roll coöperating with said receptacle for applying said material, and means for shifting the compress-roll and adhesive-applying roll toward or away from the winding-roll in unison.

32. A shell-forming machine comprising a winding-roll, a compress-roll, a receptacle for containing a supply of adhesive material, a roll for applying said adhesive material, and means for shifting the compress-roll and adhesive-applying roll toward or away from the winding-roll in unison, or independently, at the will of the operator.

33. A machine for forming tapering shells, comprising a tapering winding-roll having a conical-shaped end section removable with the completed shell.

ALFRED A. RAYMOND.

Witnesses:
S. E. HIBBEN,
LOUIS B. ERWIN.